(12) United States Patent
Cassel

(10) Patent No.: US 6,394,723 B1
(45) Date of Patent: May 28, 2002

(54) FASTENER WITH SUBSTRATE-ENGAGING PORTIONS

(76) Inventor: Donald Cassel, P.O. Box 535, Venice, CA (US) 90294

( * ) Notice: Subject to any disclaimer, the term of this patent is extended or adjusted under 35 U.S.C. 154(b) by 0 days.

(21) Appl. No.: 09/688,413

(22) Filed: Oct. 12, 2000

(51) Int. Cl.[7] .............................................. F16B 39/282
(52) U.S. Cl. ..................................... 411/188; 411/399
(58) Field of Search ......................... 411/399, 184–188, 411/180

(56) References Cited

U.S. PATENT DOCUMENTS

| | | | | |
|---|---|---|---|---|
| 452,640 | A | * | 5/1891 | Gerry |
| 1,820,556 | A | * | 8/1931 | Campbell |
| 1,864,211 | A | * | 6/1932 | Olson |
| 1,894,708 | A | * | 1/1933 | Sardeson |
| 2,056,688 | A | * | 10/1936 | Peterka |
| 3,295,580 | A | * | 1/1967 | Waltermire |

* cited by examiner

Primary Examiner—Flemming Saether
(74) Attorney, Agent, or Firm—Marshall E. Rosenberg

(57) ABSTRACT

A fastener for removably securing components to a skateboard is disclosed. The fastener includes a bolt having a head from which one or more fillets extend in coaxial alignment along the bolt shaft, and are equiangularly spaced about the bolt shaft. The fillets decrease in outer diameter as they extend down from the bolt head and terminate at or above a threaded or non-threaded extent of the shaft. Outer flange-like tips extend from the substantially planar bolt head in a spaced, circumferential arrangement, and optionally, the flanges are turned down at their distal ends in the direction of the top surface of the skateboard. When tightened, the fillets engage with the walls of the bolt hole and the flanges bite into the top surface of the skateboard, preventing rotation of the bolt in the fully installed condition but enabling ready removal of components as desired.

11 Claims, 3 Drawing Sheets

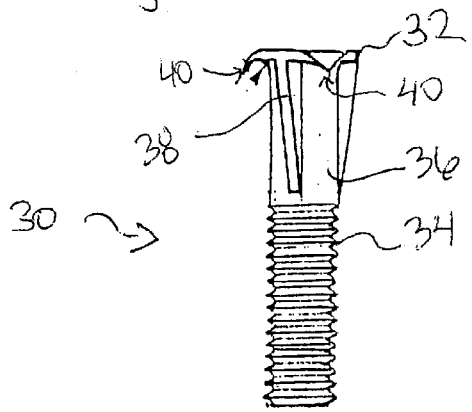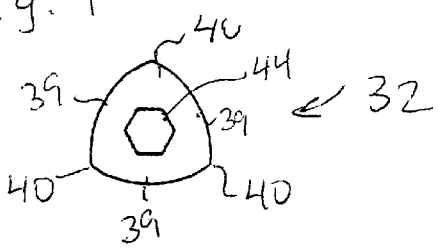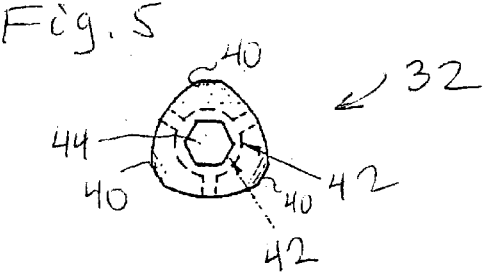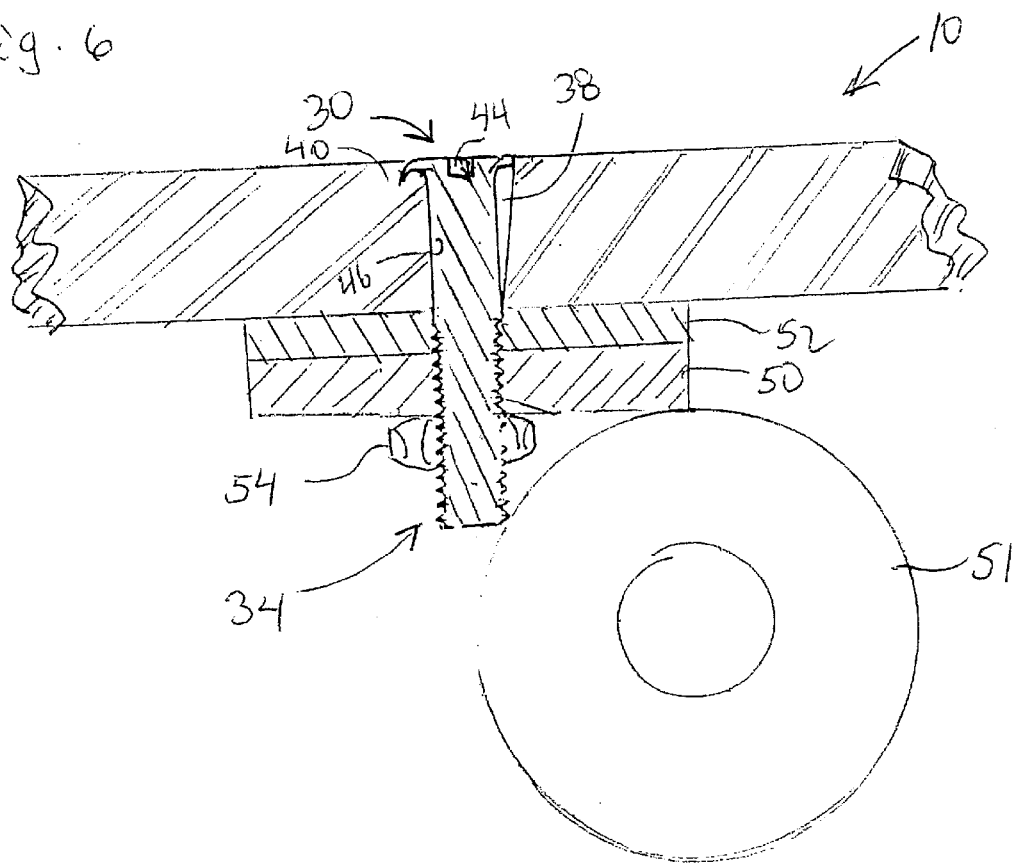

US 6,394,723 B1

FASTENER WITH SUBSTRATE-ENGAGING PORTIONS

BACKGROUND OF THE INVENTION

1. Field of the Invention

The present invention relates to fasteners, and more particularly to a fastener for high impact applications especially common in the field of skateboarding.

2. Description of the Related Art

Skateboards are commonly used for recreation and competition purposes. Typical skateboards comprise an elongated board supported on two spaced-apart wheel trucks comprising two wheels each mounted to the underside of the elongated board. Skateboard trucks may further utilize a high performance grinding king pin for attaching a skateboard truck to a baseplate, such as the high performance king pin shown in U.S. Pat. No. 4,898,298. The elongated board is constructed of a high impact, resilient and durable material such as a wood laminate or the like, on which the skateboard rider balances himself and adjusts the direction of travel by adjusting the pressure of his weight at various locations on the board.

Due to tremendous forces exerted upon the skateboard, it is desirable to be able to remove the trucks, wheels, and other components for repair or replacement on a periodic basis. Heretofore, skateboard trucks have been secured to the elongated board by carriage bolts and the like extending through a recess formed in the board. It is important that the attachment hardware does not introduce an impediment to the skateboard rider on the top surface of the skateboard. Thus, an important shortcoming of the fastener of the prior art is the absence of suitable gripping surfaces on the typically smooth head of the carriage bolt to enable a positive disengagement and effect good torque against the attachment hardware when a wrench is applied to a fastener at the underside of the elongated board, for securing the truck or other component to the underside of the board. Damage to the top surface of the elongated board, such as splitting of the top wood surface, is known to occur when inappropriate tools are applied to the bolt head in an effort to loosen the carriage bolts and provide the necessary amount of torque. Moreover, the prior art carriage bolt is known to shift and rotate during removal and installation and even when the skateboard is being ridden by impact and vibration, thus causing internal wear and tear of the elongated board and possibly shortening the life of the elongated board.

SUMMARY OF THE INVENTION

Accordingly, it is an object of the present invention to provide a fastener for securing trucks and other components to a skateboard, the fastener providing a secure attachment system while enabling ready removal of selected components without damage to the skateboard during removal and replacement.

Another object of the present invention is to provide a fastener having greater torque capacity and yet is readily secured to the skateboard, especially over a period of time and use.

Yet another object of the present invention is to provide a fastener that is simple and inexpensive to manufacture, and is interchangeable with fasteners of the related art.

These and other object and advantages are obtained with a bolt having a head from which one or more fillets extend in coaxial alignment along the bolt shaft, and are equiangularly spaced about the bolt shaft. The fillets decrease in outer diameter as they extend down from the bolt head and terminate at or above a threaded extent of the shaft. Outer flange-like tips extend from the substantially planar bolt head in a spaced, circumferential arrangement, the flanges being turned down in the direction of the top surface of the skateboard. When tightened, the fillets engage with the walls of the bolt hole and the flanges bite into the top surface of the skateboard, preventing rotation of the bolt in the fully installed condition when a wrench is applied to a fastener at the underside of the skateboard to, for example, remove and replace a truck, and providing a stable attachment system therebetween.

The invention will be better understood upon a reading of the following specification, read in conjunction with the accompanying drawings.

BRIEF DESCRIPTION OF THE DRAWINGS

FIG. 3 is an elevational view of a first embodiment of the fastener of the present invention.

FIG. 4 is a top view of the fastener shown in FIG. 3 before tabs are formed at outer portions thereof.

FIG. 5 is a top view of the fastener shown in FIG. 4, after downward extending tabs are formed.

FIG. 6 is a partial cross-sectional view of the fastener of the present invention installed in a skateboard, showing the fastener fillets and downwardly extending bolt head fillets fully engaged with the skateboard substrate, securing a truck to the skateboard.

DETAILED DESCRIPTION OF THE INVENTION

Figure 1:
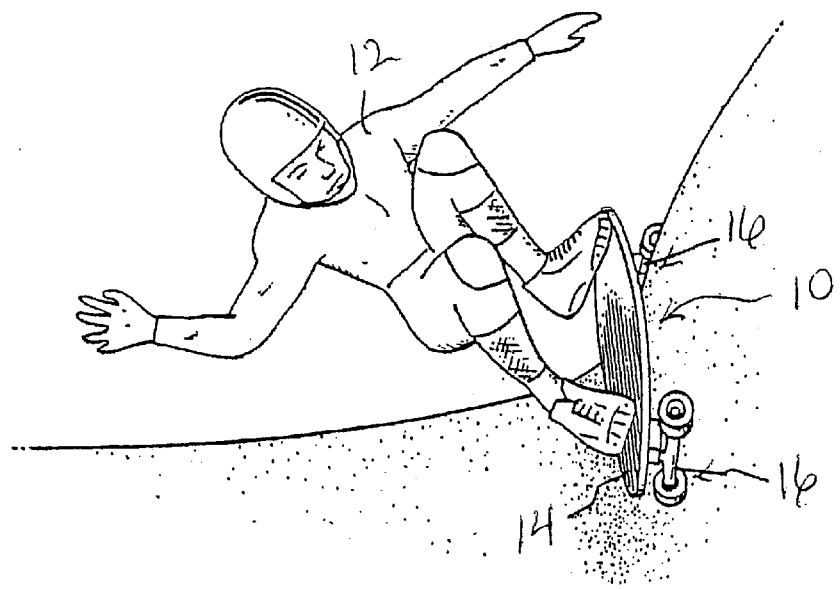
FIG. 1 is a perspective view of a skateboard rider aboard a skateboard equipped with the fastener of the present invention.
Figure 2:
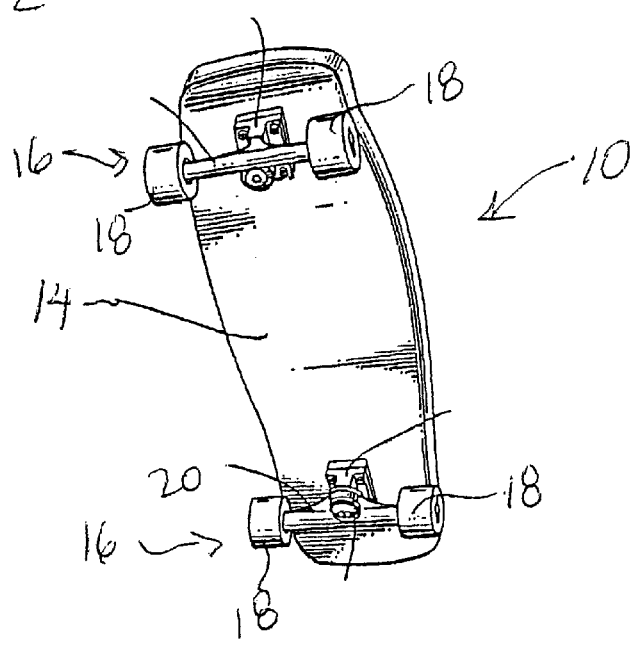
FIG. 2 is a perspective view of a skateboard showing the relative position of the front and rear trucks and mounting arrangement.

With reference now to the drawings, and according to the present invention, FIG. 1 illustrates a skateboard 10 in a typical situation being ridden by a rider 12. With reference also to FIG. 2, the skateboard 10 includes an elongated board 14 supported on two spaced-apart wheel trucks 16 comprising two wheels 18 each mounted to an axle 20, thence to truck attachments as will be appreciated by the skilled artisan, which is then affixed to the underside of the elongated board, utilizing the fastener of the present invention.

With reference now to FIGS. 3–6, a first embodiment of the present invention will be further described. In particular, the first embodiment includes a fastener 30 having a head 32 and a shaft 34. As will be more fully described below, the shaft 34 may be threaded along its entire extent, according to one embodiment of the present invention, or partially threaded with a non-threaded extent 36 positioned between the fastener head 32 and the threaded extent. According to the present embodiment, a 10/32 fine thread may be utilized in common with fastener nuts of similar skateboard equipment.

According to the invention, extending from the head 32 is one or more substrate-engaging fillets 38 extending in coaxial alignment along the fastener shaft 34. The fillets 38 according to one embodiment may be equiangularly spaced about the fastener shaft 34. The fillets 38 decrease in cross-section as they extend down from the fastener head 32 and terminate at or above a threaded extent of the shaft, i.e., within the non-threaded extent 36 as shown in FIG. 3. The decreasing cross-section assists in introducing and engaging the fillets to the walls of the fastener bore as the fastener 30 is advanced into, engaged with and finally and fully seated within the fastener bore, thereby reducing or even eliminating rotation of the fastener 30 during assembly or disassembly of a truck to the skateboard 10. This is an important improvement over the related art fasteners, wich have non-tapering fillets which may be initially embedded in the sidewalls of the fastener bore; but are easily stripped away under torque applied by a fastener removal tool, in turn allowing the fastener to spin freely in the fastener bore, and thereby preventing non-damaging removal of the fastener.

With reference to FIGS. 4 and 5, outer flanges 40 extend radially outwardly from the substantially planar fastener head 32 in a spaced, circumferential arrangement, each fillet 38 extending from a web 39 conjoining adjacent pairs of flanges 40, to an intermediate extent of the shaft 34. As more fully illustrated in FIG. 5, phantom lines 42 show the equiangularly spaced, offset fillets 38 relative to the fastener head 32. In the fully formed condition, outer flanges 40 are down turned to provide substrate-engaging projections to bite into and assist in securing the fastener 30 to the top surface of the skate board 10. Alternatively, the outer flanges 40 are not down turned, but rather, are tightened into an embedded condition in the top surface of the skateboard 14, as will be more fully described below in connection with the second embodiment of the invention shown in FIGS. 7 and 8.

A tool-receiving recess 44 is formed in a top surface of the fastener head 32 for receiving a tool such as an Allen-head wrench, Phillips head screwdriver or other driver as will be appreciated by the skilled artisan, and thus provides additional torque-applying capability during assembly/disassembly while overcoming one of the shortcomings of the related art as described above. It will be appreciated by the skilled artisan that although three fillets 38 and three flanges 40 are shown herein, a greater or lesser number or combination of fillets and flanges may be utilized to develop a desired fastener and skateboard strength and retention characteristics. For example, five flanges provided in a star-shaped arrangement are contemplated by the present invention. The fastener 30 has a tough steel construction with a black oxide finish. Fastener length will vary with a particular skateboard application, and in its preferred embodiment is available in lengths ranging from 0.875 inch to 1.250 inch, although lesser and greater lengths are contemplated within the scope of the invention.

With reference now to FIG. 6, the present invention is shown in the fully installed condition. Assembled to skateboard 10 is a truck 50, supporting exemplary wheel 51, and baseplate 52, both having recesses for receiving in assembled condition against the skateboard 10 the fastener 30. During assembly, the fastener 30 is advanced into borehole 46 formed in the skateboard 30, such that the fillets increasing engage with the walls of borehole 46 as the fastener 30 is advanced into, engage with and finally and fully seat within the fastener bore 46. Simultaneously, outer flanges 40 bite into and assist in securing the fastener 30 to the top surface of the skate board 10. A nut 54 or other fastener is then applied to the shaft 34 and tightened to secure the skateboard 10 and truck 50 together, further securing the fillets 38 and flanges 40 within the substrate of the skateboard 10 in a highly secured configuration. Disassembly is readily achieved by reversing the above steps, while applying an Allen-head wrench to prevent rotation of the fastener 30 while the nut 54 is loosened and removed.

Figure 7:
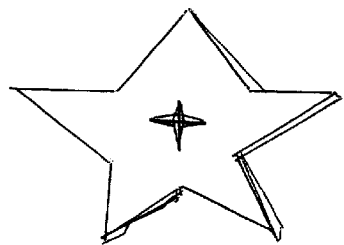
FIG. 7 is a top view of the fastener according to a second embodiment of the present invention.
Figure 8:
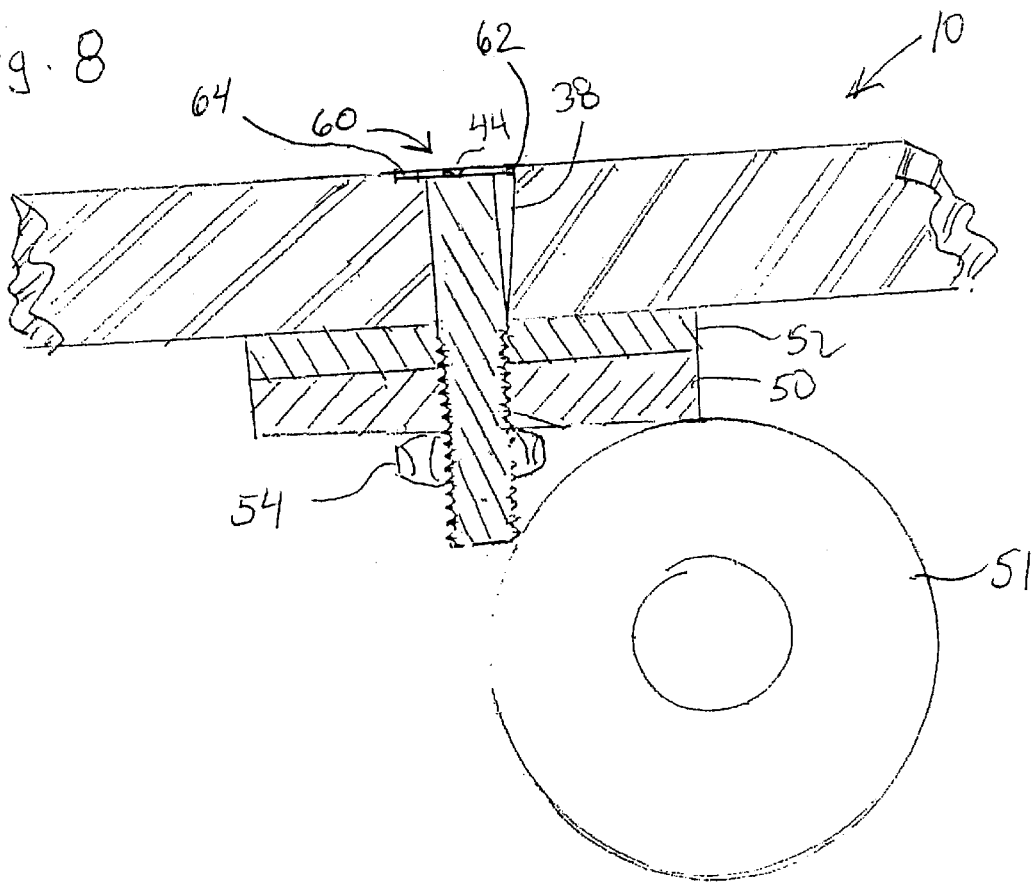
FIG. 8 is an elevational view of the fastener shown in FIG. 7, shown in a fully engaged position in a substrate such as a skateboard.

With reference now to FIGS. 7 and 8, the second embodiment shown therein is a fastener 60 having a head 62 from which an odd-number plurality, preferably three (3) or five (5), of flanges 64 extend in the manner described above in connection with the first embodiment, i.e., extend radially outwardly from the substantially planar fastener head 62. According to this embodiment, it has been determined that three or five flanges are necessarily offset one from the next and thus do not accentuate the prior art problem of splitting of wood fibers linearly arranged along the skateboard 14. Also according to this second embodiment, the distal ends of the flanges 64 are not down turned to provide substrate-engaging projections to bite into and assist in securing the fastener 60 to the top surface of the skate board 14. Rather, the fastener 60 is tightened in the conventional manner to bring the substantially planar flanges 64 into an embedded condition in the top surface of the skateboard 14, thereby providing additional grip between the fastener head 62 and the skateboard 14. It will be further appreciated that according to either embodiment, only a single tool is required to release the fastener 30, 60 from the skateboard 14 and truck 50 mounted thereto.

It is to be understood that the present invention is not limited to the embodiments described above, but encompasses any and all embodiments within the scope of the following claims.

I claim:

1. A fastener comprising:
   a shank having a threaded portion;
   a head provided at one end of the shank, the head including at least two radially outwardly extending flanges for engaging with a mounting substrate, each said flange extending to a downwardly turned projection; and
   a fillet extending with a decreasing cross-sectional width from each of the at least two radially outwardly extending flanges to an intermediate extent of the shank the plurality of fillets being equiangularly arrayed about the shank;
   wherein the fillets and projections are arrayed in alternating order.

2. The fastener as recited in claim 1, wherein each said fillet extends from a web joining each pair of contiguously formed flanges.

3. The fastener as recited in claim 1, wherein the shank includes an non-threaded portion extending between the head and the threaded portion, and the fillet extends to an intermediate extent of the non-threaded portion.

4. The fastener as recited in claim 1, wherein the projections have a surface engaging leading edge.

5. The fastener as recited in claim 1, further comprising a tool-receiving recess formed in a top surface of the head.

6. A fastener for securing accessories to a skateboard, comprising:
   a shank having a head, a threaded portion and a non-threaded portion therebetween,
   the head including a plurality of coplanar radially outwardly extending flanges, each flange extending to a downwardly turned projection,
   a plurality of substrate-engaging fillets, each fillet extending from a web conjoining adjacent pairs of flanges, to the non-threaded portion of the shank, wherein the fillets and projections are arrayed in alternating order.

7. The fastener as recited in claim 6, wherein the plurality of fillets is equiangularly arrayed about the shank.

8. The fastener as recited in claim 6, wherein the plurality of flanges is equiangularly arrayed about the head.

9. The fastener as recited in claim 6, further comprising a tool-receiving recess formed in a top surface of the head.

10. The fastener as recited in claim 9, wherein the tool-receiving recess is shaped to receive a tool selected from the group including Allen-head wrenches and Phillips-head drivers.

11. The fastener as recited in claim 6, wherein the accessories are selected from the group including trucks and bumpers.

* * * * *